United States Patent [19]

Thompson

[11] 4,218,207
[45] Aug. 19, 1980

[54] DOUGH-DIVIDING AND TOROID-FORMING APPARATUS

[75] Inventor: Daniel T. Thompson, Pacific Palisades, Calif.

[73] Assignee: Thompson Bagel Machine Manufacturing Corp., Los Angeles, Calif.

[21] Appl. No.: 949,041

[22] Filed: Oct. 6, 1978

[51] Int. Cl.² .................... A21C 5/00; A21C 11/12
[52] U.S. Cl. .................... 425/241; 425/290; 425/291; 425/297; 425/327; 425/343; 425/356; 425/364 B
[58] Field of Search ............ 425/290, 297, 301, 305.1, 425/327, 343, 356, 364 B, 291, 238, 239, 241; 426/503

[56] References Cited

U.S. PATENT DOCUMENTS

3,517,622  6/1970  Schneider et al. ............ 425/364 B X

Primary Examiner—Jan H. Silbaugh
Attorney, Agent, or Firm—Poms, Smith, Lande & Rose

[57] ABSTRACT

Dough-dividing and forming apparatus particularly adapted for forming toroid-shaped articles such as bagels, or the like, is disclosed. A first rotary plate member containing a plurality of cylindrical openings receives a cylindrical ribbon of dough into the openings and shears the dough into disc-shaped dough lumps. The dough lumps are subsequently flattened in the center to form a web and pierced to form a generally annular shape. During the piercing operation, the dough lumps are transferred to a second rotary plate member carrying a plurality of tapered, cylindrical forming cups. As the second plate member is indexed between rotary positions, a plurality of cylindrical mandrels are repeatedly thrust into and out of the forming cups to roll the dough lumps internally along the length of the forming cups whereby the desired shape is formed.

6 Claims, 12 Drawing Figures

DOUGH-DIVIDING AND TOROID-FORMING APPARATUS

BACKGROUND OF THE INVENTION

The present invention relates to dough-forming apparatus and methods and more particularly, to apparatus and methods of forming dough into toroid shapes.

Mechanical apparatus for the forming of dough into toroid shapes is not new. Moreover, apparatus specifically designed for forming of bagels is known in the art.

Products formed from dough typically have unique characteristics which depend upon the type of dough and the method of forming. Bagels are characterized by being toroid-shaped and being optimally formed with a minimum of working of the dough. Typically, bagel forming apparatus moves a dough ribbon between a cylindrical mandrel and a forming cup being a cylinder of a larger diameter.

In such forming apparatus according to the prior art, sufficient working must be employed to join free ends. This is because the mandrel must be supported in some manner. Typically, the dough ribbon is placed around the mandrel in a U-shape and worked towards the unsupported end by a plurality of cup-shaped forming members with sufficient working to cause the free ends of the U-shaped dough ribbon to come into proximity and join together. The necessity for working the dough sufficiently to join the free ends creates a bagel which is tougher than it could be if a lesser amount of working were employed.

Wherefore, it is the object of the present invention to provide method and apparatus for the forming of bagels or the like comprising a toroid of formed dough wherein no free ends requiring joining are created whereby the forming operation can be accomplished with a minimum of working of the dough.

SUMMARY

The foregoing objectives have been met by apparatus accomplishing the steps of forming a generally disc-shaped dough lump; piercing the disc-shaped dough lump to form an annular dough lump; and, rolling the annular dough lump through an outwardly tapering cylindrical forming cup with a cylindrical mandrel to roll the disc-shaped dough lump into the required bagel shape.

The apparatus shown accomplishes the rolling step by positioning the annular dough lump adjacent the inlet opening of the forming cup in concentric alignment therewith; thrusting the mandrel into the center of the annular dough cup to roll the annular dough lump a portion of the length of the forming cup; rapidly withdrawing the mandrel from the annular dough lump with sufficient speed that, in combination with the taper of the forming cup, the withdrawing of the mandrel causes measurably less rolling of the annular dough lump back towards the inlet of the forming cup than the forward movement thereof; and, repeating the thrusting and withdrawing steps thus described until the bagel emerges from the outlet end of the forming cup.

The apparatus disclosed accomplishes the piercing of the disc-shaped dough lump to form the annular dough lump by the steps of compressing the center portion of the disc-shaped dough lump against a planar surface with a disc-shaped presser member to form a disc-shaped web in the center of the disc-shaped dough lump; holding the disc-shaped presser member against the dough lump for a sufficient time to let the dough rest and stabilize at the configuration thus attained; withdrawing the disc-shaped presser member from the dough lump and the planar surface from adjacent the web; piercing the web beginning at the center thereof with a conical-ended mandrel to force the dough of the web radially outward equally into the annular portion of dough surrounding the web; and, withdrawing the tapered mandrel from the dough lump.

DESCRIPTION OF THE PREFERRED EMBODIMENT

Figure 1:
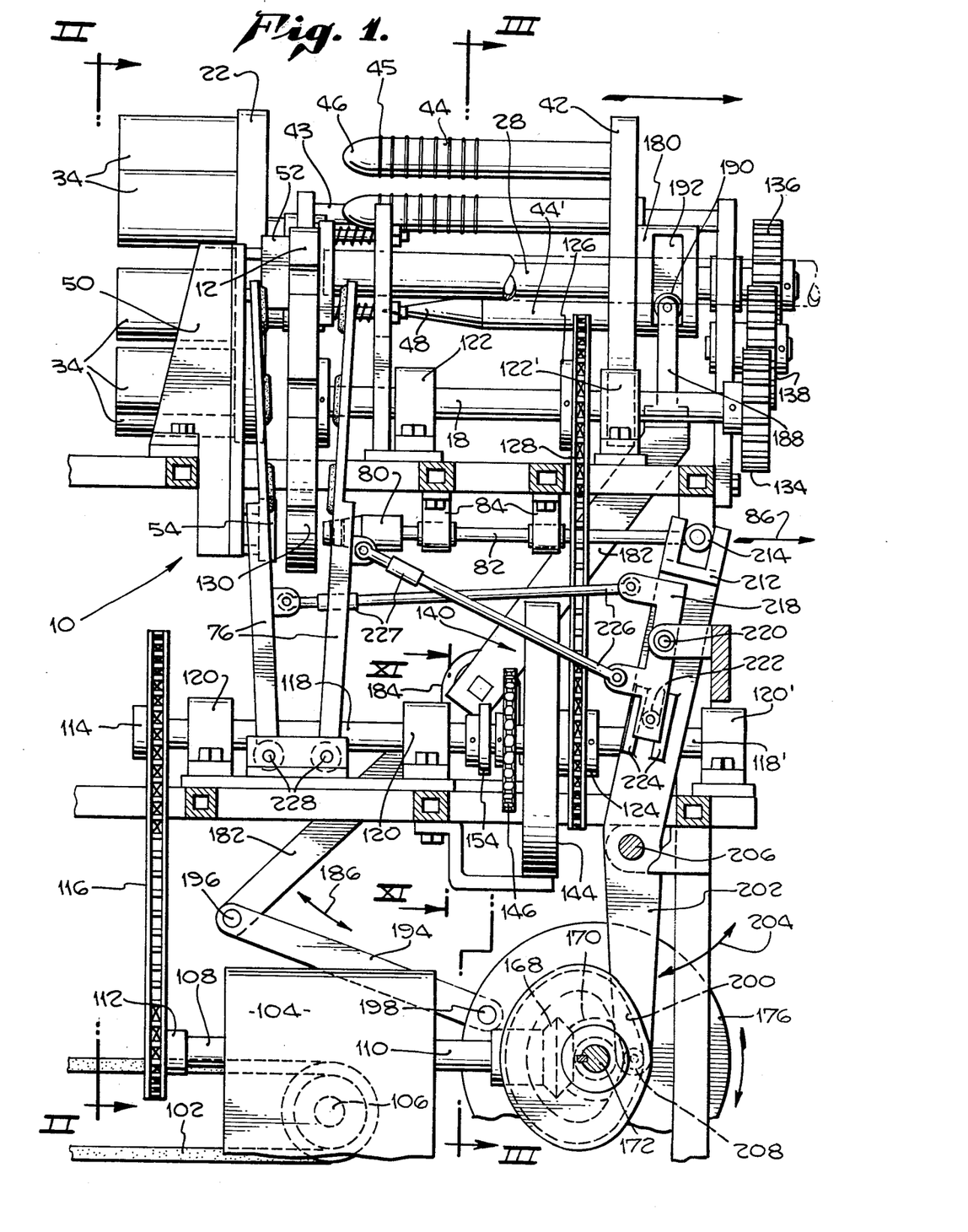
FIG. 1 is a side elevation of apparatus according to the present invention.
Figure 2:
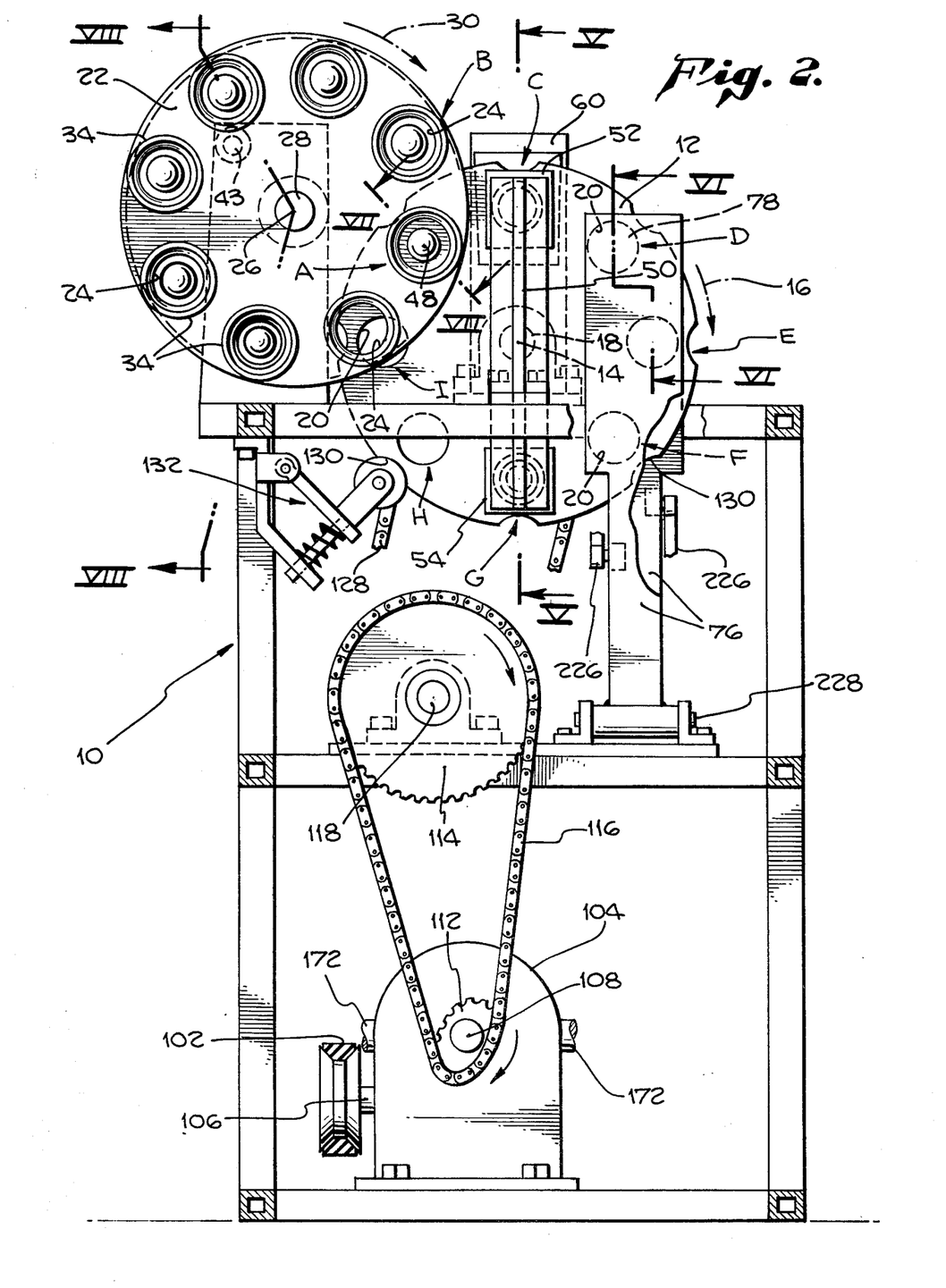
FIG. 2 is an end elevation of the apparatus of FIG. 1 as seen in the plane II—II.

The bagel-forming apparatus of the present invention is shown generally as 10 in the side elevation of FIG. 1 and the end elevation of FIG. 2. Briefly, the apparatus comprises a first rotary plate 12 adapted for rotation about a first axis 14 in the direction of arrow 16 by shaft 18. First rotary plate 12 contains a plurality of cylindrical openings 20 disposed equally distant about a common radius from first axis 14. A second rotary plate 22 is disposed behind the first rotary plate 12 (proceeding from right to left as FIG. 1 is viewed) containing cylindrical openings 24 also disposed equally distant about a common radius from a second axis 26 about which the second rotary plate 22 revolves on shaft 28. Second rotary plate 22 is adapted to rotate on shaft 28 in the direction of arrow 30. As can be seen, the shafts 18, 28 are parallel and disposed at a distance whereby at one position (labeled A) one cylindrical opening 20 of first rotary plate 12 and one cylindrical opening 24 of second rotary plate 22 are concentrically aligned. Indexing means (to be hereinafter described) are provided for rotating the plates 12, 22 one position at a time into coincidence at position A. That is, when plates 12, 22 are indexed one position in the manner to be hereinafter described, the cylindrical openings 20, 24 labeled B and I respectively in FIG. 2 will next come into coincidence at position A.

The second rotary plate 22 carries a plurality of forming cups 34 on the side opposite the first rotary plate 12. The forming cups 34 can best be seen with reference to FIG. 8. As can be seen therein, each cup 34 is disposed within a cylindrical opening 24 having an inlet 36 adapted to receive annular dough lumps and guide them into the forming cup 34. The interior of the forming cups 34 tapers outwardly as at 38 from the inlet 36 towards the outlet at 40. That is, the interior diameter adjacent the inlet 36 is smaller than the diameter at the outlet 40. Additionally, the interior of the forming cups 34 is provided with a plurality of spaced gripping ridges 41 as can best be seen with reference to FIG. 8. In a tested embodiment of the present invention wherein the forming cups 34 were six inches long and tapered outwardly from an inlet and diameter of 2.1875 inches to an outlet diameter of 2.6875 inches, the first three ridges 41 were 0.100 inches high and 0.150 inches wide spaced 0.310 inches apart with the first ridge 41 0.310 inches in from the inlet end. Thereafter, the ridges 41 were 0.030 inches high by 0.060 inches wide at a spacing of 0.500 inches. The result of this configuration will be understood following the discussion which follows hereinafter.

Figure 8:
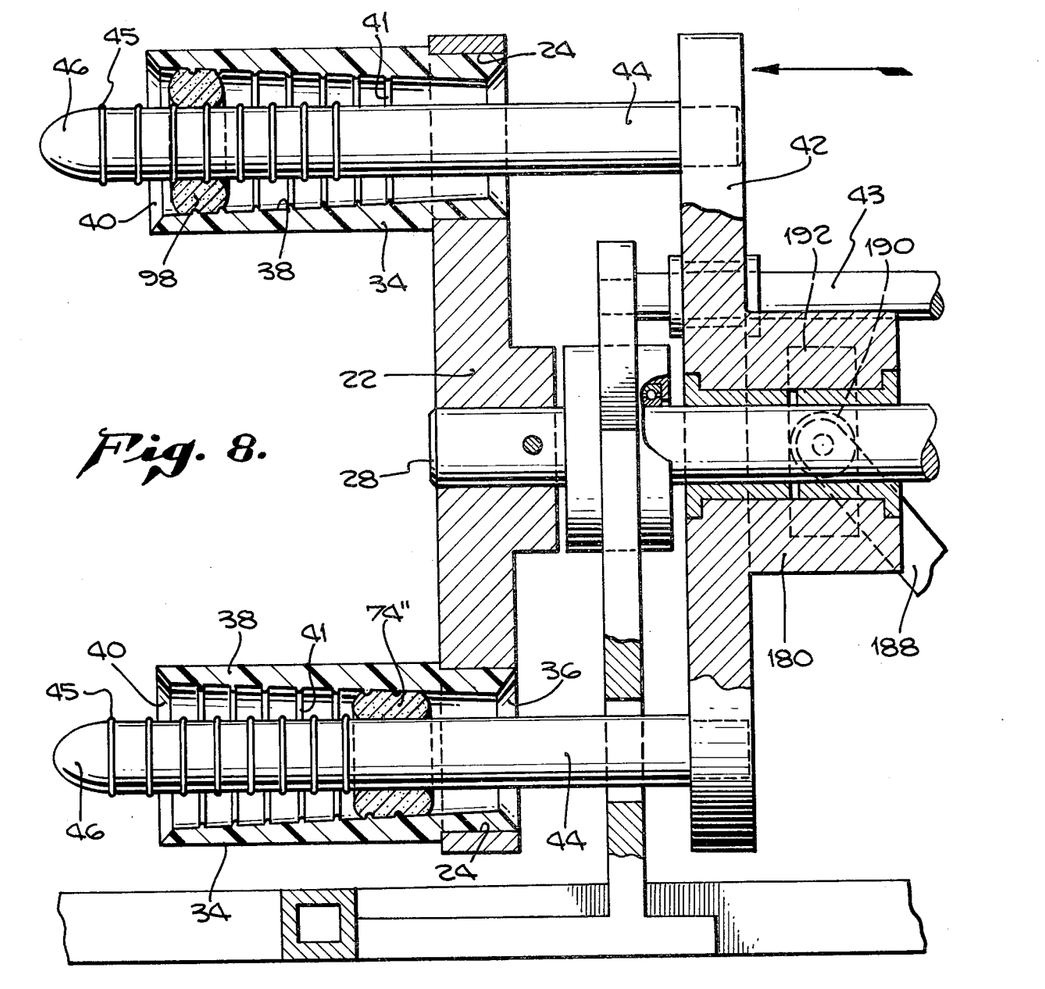
FIG. 8 is a cut-away view through the second rotary plate of the apparatus of FIG. 1 as seen in the plane VIII—VIII of FIG. 2.

With reference to FIG. 1 and FIG. 8, a non-rotary plate 42 is carried on shaft 28 along guide rod 43 for longitudinal movement between a removed position as shown in FIG. 1 and a close adjacent position as shown in FIG. 8. Non-rotary plate 42 has a plurality of cylindrical mandrels 44 carried thereby on one end and facing in the direction of first and second rotary plates 12, 22. The mandrels 44 are disposed to be concentric with the cylindrical openings 24 and forming cups 34 when one cylindrical opening 20 and one cylindrical opening 24 are in concentric coincidence at the position A. Thus, as can be seen in FIG. 8, by moving non-rotary plate 42 towards second rotary plate 22, the mandrels 44 can be thrust concentrically into the forming cups 34. While the majority of the cylindrical mandrels have a smoothly curved end 46 as shown, the one mandrel 44' which is in positional coincidence with position A has a tapered conical end 48 used for piercing the dough lumps in a manner which will be described hereinafter. Additionally, in the previously described tested embodiment, the mandrels 44 (but not piercing mandrel 44') well 11.5 inches long and provided with a plurality of longitudinally spaced exterior circumferential gripping ridges 45 being 0.030 inches high and 0.060 inches wide at 0.500 inche spacing, as shown. At a stroke length of 10.25 inches at 36 strokes per minute, 180 dozen bagels per hour were produced.

Figure 5:
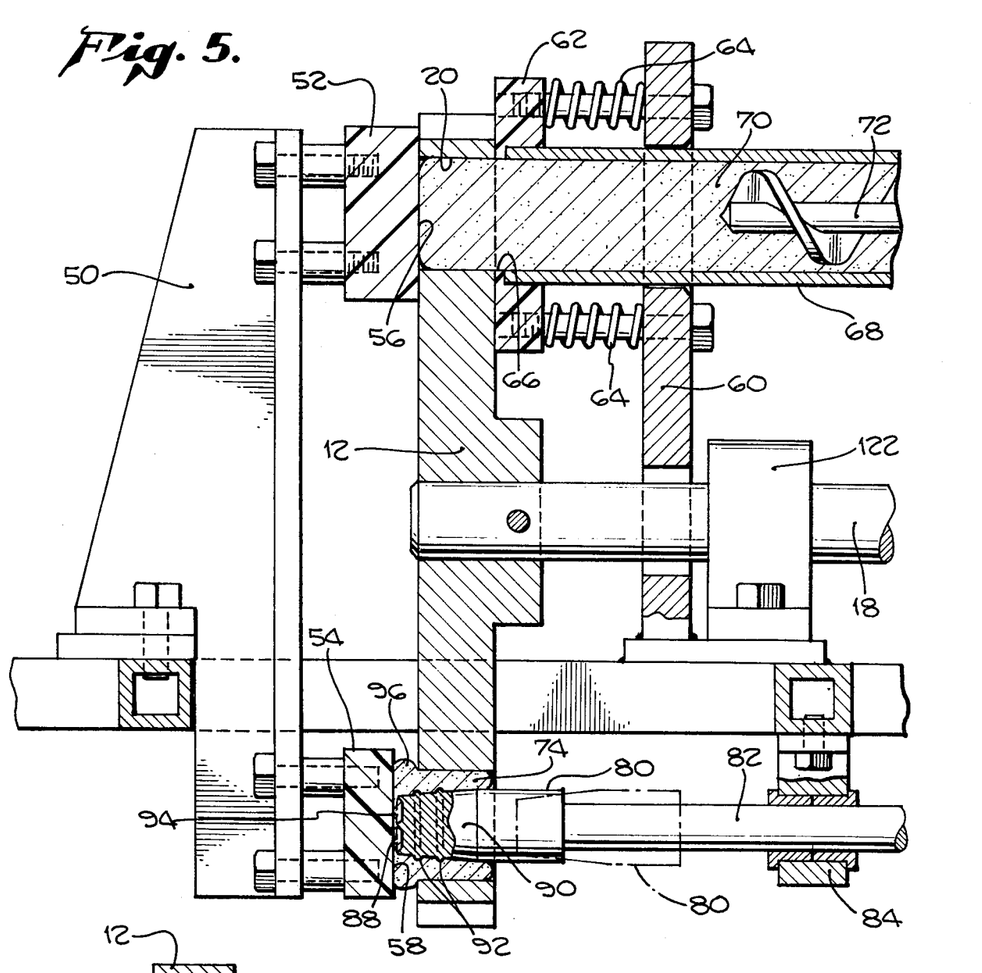
FIG. 5 is a cut-away side view of the apparatus of FIG. 1 through the first rotary plate member as seen from the plane V—V of FIG. 2.

Referring now briefly to FIGS. 2 and 5, the action of first rotary plate 12 will be discussed in greater detail. Beginning at the most vertical position indicated in FIG. 2, the remaining positions of the cylindrical openings 20 clockwise as FIG. 2 is viewed are labeled C, D, E, F, G, H, and I. A vertical support member 50 is disposed to carry a pair of support blocks 52 and 54 adjacent the side of plate 12 closest to plate 22 at positions C and G. Support block 52 adjacent position C provides a planar surface 56 against which first rotary plate 12 slides. By contrast, support block 54 is disposed in spaced relationship to first rotary plate 12 with its planar surface 58 slightly spaced from first rotary plate 12 to provide an action which will be described hereinafter. A second vertical support member 60 is disposed on the opposite side of first rotary plate 12 from block 52. A pressure block 62 is carried by second vertical support member 60 through springs 64 to press first rotary plate 12 between pressure block 62 and support block 52. Pressure block 62 has a cylindrical opening 66 disposed therein adapted to align with cylindrical opening 20 at position C. A conduit 68 is connected to pressure block 62 on one end and to a supply (not shown) of dough 70 delivered under pressure such as by auger means 72.

As each cylindrical opening 20 is positioned at position C, a cylindrical ribbon of dough 70 from conduit 68 enters and fills the cylindrical opening 20 and is stopped on the opposite side by pressure block 52. As first rotary plate 12 is indexed from position C to position D, the dough 70 within the cylindrical opening 20 is sheared into a dough lump 74 by the wiping and shearing action of plate 12 moving between support block 52 and pressure block 62. Because of the shearing and wiping action which creates the dough lump 74 within the cylindrical opening 20 at position D, that dough lump 74 tends to be pressed against the side of the cylindrical opening 20 at position D toward position C. Before the forming action of piercing and rolling of the present invention to be described hereinafter can take place, the dough lump 74 must be radially equally distributed within the cylindrical opening 20 as a generally disc-shaped piece. This is accomplished by a pressing action which takes place at positions D, E and F.

Figure 4:
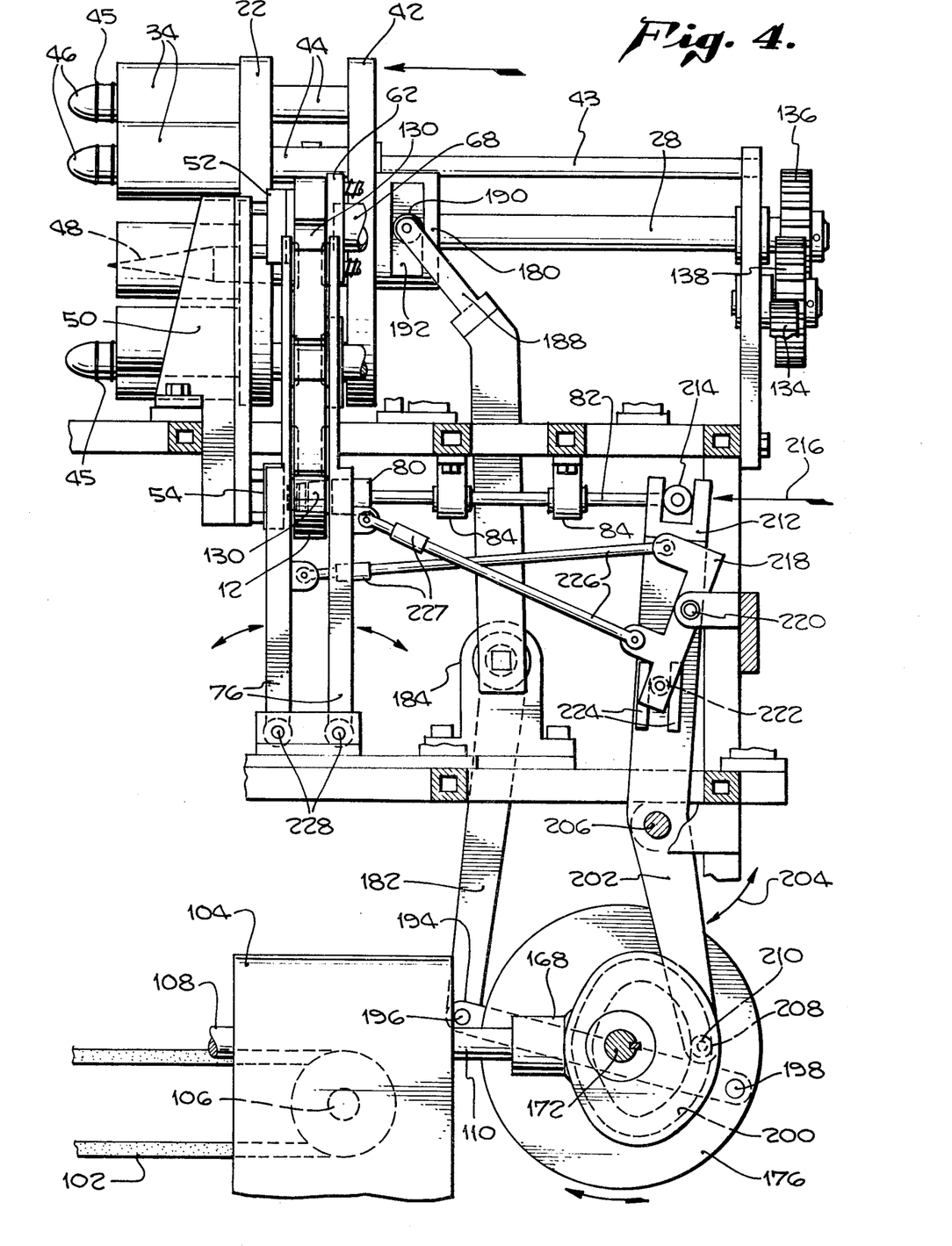
FIG. 4 is a side elevation of the apparatus of FIG. 1 as seen from the plane IV—IV of FIG. 3.
Figures 6, 7:
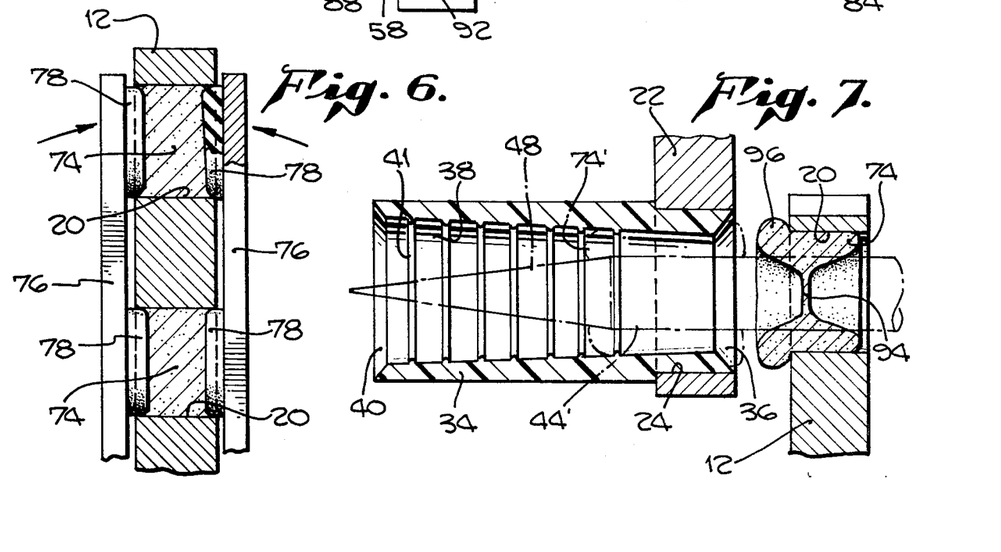
FIG. 6 is a cut-away side view through the first rotary plate member as seen in the plane VI—VI of FIG. 2.
FIG. 7 is a cut-away view through the first rotary plate and second rotary plate of the apparatus of FIG. 1 as seen in the plane VII—VII of FIG. 2 particularly showing the position of concentric coincidence between the cylindrical openings of the first rotary plate and the forming cups of the second rotary plate.

Referring briefly to FIGS. 1, 4, and 6, a pair of movable arms 76 are disposed on either side of first rotary plate 12. Each movable arm 76 has a rubber pressure pad 78 adjacent positions D, E, and F. As first rotary plate 12 is indexed between positions, movable arms 76 are rotated away from first rotary block 12 as in the position of FIG. 1 by means to be described more fully hereinafter. As the first rotary plate 12 arrives at its new position, movable arms 76 are moved to their position close adjacent first rotary block 12 as shown in FIG. 4. This causes the pressure pads 78 to compress the dough lump 74 within each cylindrical opening 20 at positions D, E, and F until the desired disc shape is achieved. The shape of the pads 78 can also be used to compensate for different volumes of dough. That is, if less dough is to be in each final product, the pads 78 can be raised in the center to force the less dough radially outwardly in a preforming step.

Referring now to FIG. 1 and 5, a presser member 80 is mounted on shaft 82 and carried by support members 84 for longitudinal movement as indicated by the arrow 86 along a line concentric with the cylindrical opening 20 at position G between the retracted position of FIG. 1 (also shown ghosted in FIG. 5) and the inserted position of FIG. 5. As first rotary plate 12 is revolved in the direction of arrow 16 from position to position, presser member 80 is maintained in its retracted position. Each time a new disc-shaped dough lump 74 arrives at position G, shaft 82 is extended by means to be discussed hereinafter to press the presser member 80 into the adjacent dough lump 74. The presser member 80 is provided with a generally disc-shaped face 88 disposed parallel to the planar surface 58 of support block 54. Shaft 82 is adapted to stop pressure member 80 at a position where the disc-shaped face 88 is in close spaced relationship to planar surface 58. As can be seen, the forward portion 90 of presser member 80 is provided with gripping ridges 92 disposed concentrically thereabout. Thus, as presser member 80 is thrust into the disc-shaped dough lump 74, a thin web 94 is created in the center thereof with an annular portion 96 about the periphery. As the presser member 80 is withdrawn, the gripping ridges 92 tend to roll the annular portion 96 of dough lump 94 back into cylindrical opening 20 drawing the thin web 94 into the center thereof at which time dough lump 74' releases from presser member 80 leaving dough lump 74' substantially as shown in FIG. 7. That is, an annular portion 96 with a thin web 94 disposed substantially in the middle thereof. Dough lumps 74' maintain the configuration of FIG. 7 through positions H and I.

At arriving at position A, (depicted in FIG. 7), the dough lump 74' is positioned adjacent the inlet 36 of the concentrically disposed forming cup 34. Additionally, the dough lump 74' at position A is disposed opposite mandrel 44' having the conical piercing point 48. Upon the next forward thrusting of non-rotary plate 42, conical point 48 of mandrel 44' is driven through the thin web 94 of the dough lump 74' positioned thereat, causing the web 94 to be pierced and the dough contained therein to be driven equally radially outward into the surrounding annular portion 96. Simultaneously, the dough lump 74' is carried from the cylindrical opening 20 of first rotary plate 12 into forming cup 38. Upon retraction of mandrel 44' the now annular-shaped dough lump 74" remains within the inlet 36 area of forming cup 34. Thereafter, annular dough lump 74" moves in combination with the forming cup 34 to which it was transferred during the piercing operation.

Figures 9, 10:
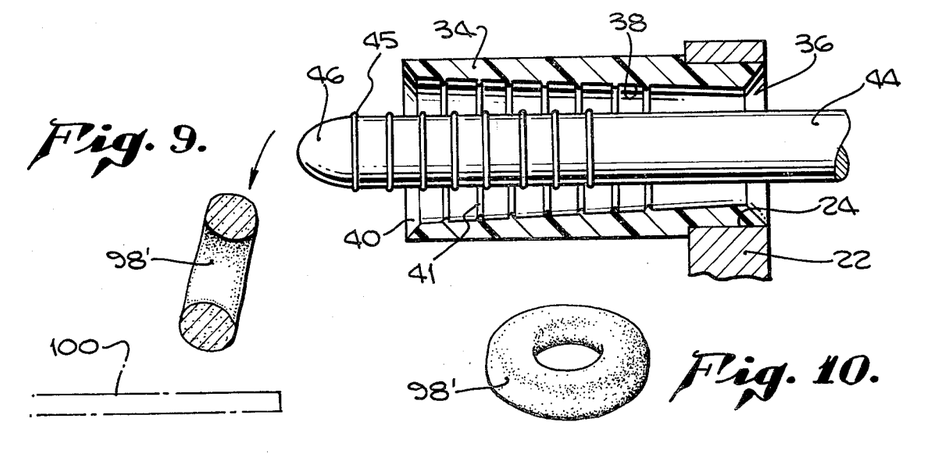
FIG. 9 is a cut-away view through one forming cup of the second rotary plate of the apparatus of FIG. 1 with the mandrel inserted therein showing the final movement of the toroid dough piece being ejected therefrom.
FIG. 10 is a view of a toroid dough piece as produced by the apparatus of the present invention.
Figure 11:
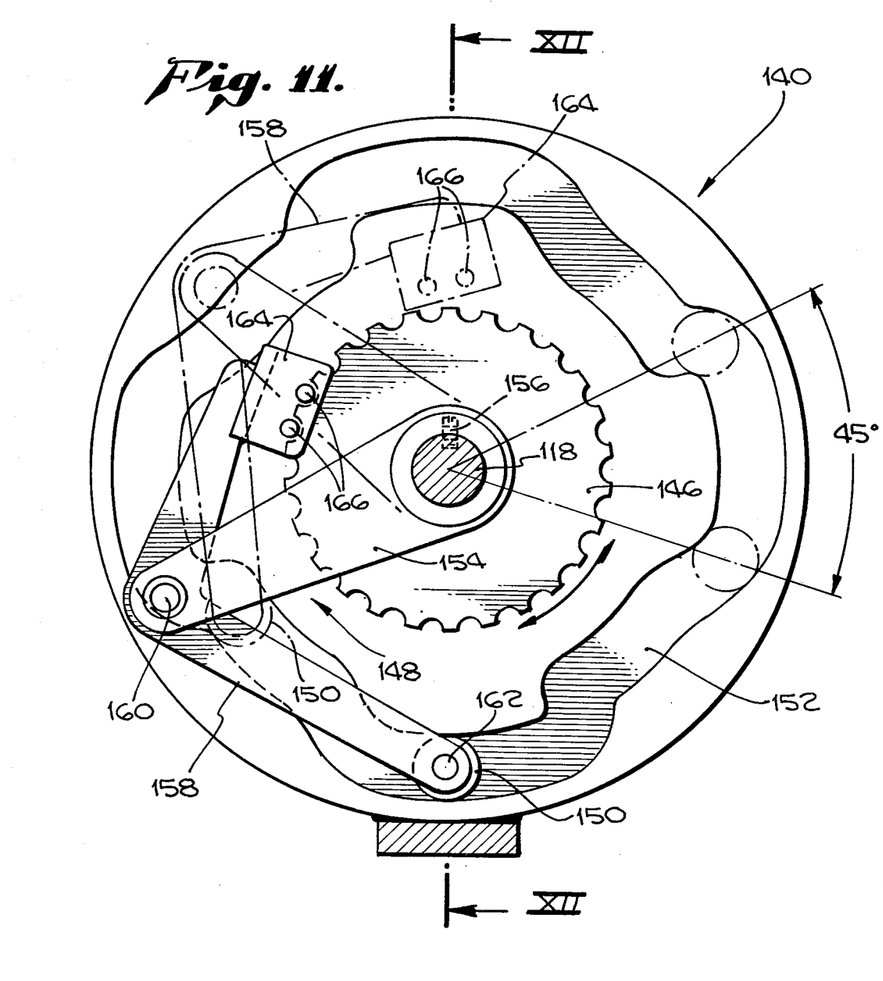
FIG. 11 is a cut-away elevation of the apparatus of FIG. 1 as shown in the plane XI—XI.

As can be seen in FIG. 2, the transferred annular dough lump 74" must rest for one positional movement of second rotary plate 22 because of the interference of first rotary plate 12 following the transfer. This gives the annular dough lump 74" a chance to stabilize and rest prior to the forming operation which follows. Referring now to FIG. 8, following the one positional rest, the annular dough lump 74" arrives at the position corresponding to the forming cup at the bottom of FIG. 8 as viewed. By mechanism to be described hereinafter, non-rotary plate 42 in thrust adjacent second rotary plate 22 causing the mandrels 44 to be thrust through the annular dough lumps 74" contained within each forming cup 34. In the thrusting operation, the annular dough lump 74" is rolled between the tapering inner surface 38 of the forming cup 34 and the mandrel 44 towards the outlet end 40 a portion of the distance. Plate 42 and mandrels 44 in combination therewith is then withdrawn, which, in combination with the taper of portion 38 of forming cups 34 and gripping ridges 41 and 45 tends to withdraw the mandrel 44 from within the annular dough lump 74" with measurably less movement backwards towards the inlet 36 than forward, resulting in a net movement in the forward direction. As the annular dough lump 74" thus moves from the inlet end 36 towards the outlet end 40 in response to the reciprocal thrusting motion of the mandrels 44, it forms into the toroid-shape 98 in the upper forming cup of FIG. 8. At the final position as shown in FIG. 9, the finally shaped toroid 98' (i.e. the bagel) is wiped from the smoothly curved end 46 of mandrel 44 by the outlet end 40 of the forming cup 34 whence it falls to a conveyor belt 100 or the like where it is conducted to the cooking process. Thus, the final bagel 98' as shown in FIG. 10 is a desired toroid shape resulting from a minimum of working of the dough and being of guaranteed continuity since there were never any discontinuities requiring fusion through working of the dough.

Having thus covered the basic operation of the bagel-forming apparatus 10 of the present invention, the specific details of the operability of the apparatus for accomplishing the foregoing will be discussed with initial reference to FIGS. 1 and 2. The moving apparatus to be described hereinafter is powered by an electric motor (not shown) connected through a V-belt 102 to the gear box 104. As the input shaft 106 of gear box 104 is rotated by V-belt 102, a pair of output shafts 108 and 110 are rotated thereby in unison. A small elliptically-shaped sprocket 112 is carried by output shaft 108 for rotation therewith. Sprocket 112 is connected to drive a large circular sprocket 114 through a driving chain 116. Circular sprocket 114 is attached to shaft 118 which, in turn, is supported by journals 120 for rotation. As will be understood by those skilled in mechanical arts, the combination of the small elliptically-shaped sprocket 112 driving the large circular sprocket 114 will cause both a speed reduction and a speed variation with respect to the driving of shaft 118. Shaft 118 is connected through an indexing means to be described hereinafter to drive shaft 18 which is mounted on journals 122 by means of circular sprockets 124 and 126 connected by driving chain 128. First rotary plate 12 is provided with a plurality of indentations 130 disposed to correspond with each position of cylindrical openings 20. Spring-loaded detent 132 is adapted to engage the indentations 130 to maintain the cylindrical openings 20 at each position A, C, D, E, F, G, H, and I. The foregoing drive apparatus is sized such that upon each one-half revolution of shaft 108, shaft 18 is driven quickly through 45° of revolution disengaging spring detent 132 to rapidly move the next indentation 130 into engagement with the detent 132 whereupon relative motion of first rotary plate 12 is stopped for a period of time sufficient for the forming actions to take place. Shaft 18 is interconnected to shaft 28 by gear 134 driving gear 136 through idler gear 138. Thus, first rotary plate 12 and second rotary plate 22 are continuously moved in the aforedescribed stop and start motion in combination. It is to be noted that while the apparatus shown and described employs eight cylindrical openings 20, 24 in each of the rotary plates 12, 22, other numbers of openings could be employed and different numbers on the respective plates 12 and 22 could be employed by appropriate modification of the gear ratios employed in the driving mechanism described heretofore and to be further described hereinafter.

Figure 12:
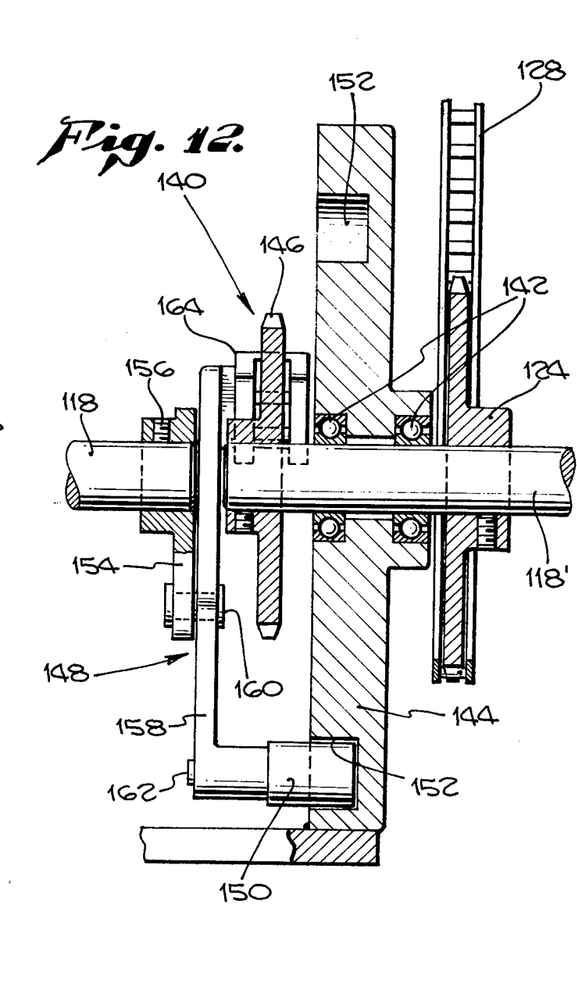
FIG. 12 is a cut-away view of the apparatus of FIG. 11 as shown in the plane XII—XII.

Referring now to FIGS. 1, 3, 11, and 12, the master indexing drive generally indicated as 140 will be described in greater detail. The master indexing drive described hereinafter is one embodiment of an indexing mechanism described in my co-pending U.S. application for Letters Patent Ser. No. 949,042 filed on Oct. 6, 1979. While the small elliptical sprocket 112 previously described provides a fast and slow operation, the master indexing drive 140 disposed between shaft 118 and circular sprocket 124 provides for complete disengagement of the driving mechanism whereby first and second rotary plates 12, 22 are maintained in complete non-moving relationship by spring detent 132 during the forming operations. As can best be seen first with reference to FIG. 12, shaft 118 is discontinuous between sprocket 114 and sprocket 124. As shown in FIG. 12, the portion of shaft 118 connected to sprocket 114 is labeled 118 while the opposite end connected to sprocket 124 is labeled 118'. Shaft portion 118' is rotatably journaled between journal 120' and bearings 142 contained within cam and support bracket 114. Toothed gear 146 is carried by the end of shaft portion 118' closest to the end of shaft 118. The end of shaft 118 closest to shaft portion 118' carries cam follower and gear-engaging arm 148 for rotation therewith. As can be seen in FIG. 12, the end of cam follower and gear-engaging arm 148 has a roller cam follower 150 disposed to ride within a cam groove 152 disposed within cam and support bracket 144. The operation of master indexing drive 140 can best be understood with primary reference to FIG. 11. As can be seen, cam follower and gear-engaging arm 148 comprises a first arm 154 rigidly connected to shaft 118 at right angles thereto and rotating in conjunction therewith as by the set screw 156. An L-shaped arm 158 is rotatably carried by first arm 154 with pivot 160. The previously described roller cam follower 150 is rotatably attached to one end of the L-shaped arm 158 by the pivot 162. As can be seen, therefore, as shaft 118 rotates from the driving force applied thereto by chain 116 through sprocket 114, first arm 154 is rotated in conjunction therewith carrying L-shaped arm 158 in conjunction therewith. Roller cam follower 150 follows the cam groove 152 provided in cam and support bracket 144. As the end of L-shaped arm 158 carrying roller cam follower 150 moves outwardly in following the cam groove 152, the opposite end of L-shaped arm 158 is moved radially inward toward shaft 118. In similar fashion, as roller cam follower 150 moves radially inward towards shaft 118 in following the cam groove 152, the opposite end of L-shaped arm 158 will move outwardly away from shaft 118. The end of L-shaped arm 158 opposite the end carrying roller cam follower 150 is provided with a yoke 164 straddling toothed gear 146 and containing engaging pins 166 therein. Thus, as roller cam follower 150 moves radially outward, yoke 164 is moved radially inward to engage the toothed gear 146 with engaging pins 166. In this position, the rotary motion of shaft 118 is transmitted through first arm 154 to L-shaped arm 158 and fro there through yoke 164 and engaging pins 166 into toothed geaar 146 to drive shaft portion 118' and circular sprocket 124 in combination therewith. As roller cam follower 150 moves radially inward, engaging pins 166 are released from their engagement with toothed gear 146 and the driving force from shaft 118 is no longer transmitted to shaft portion 118'. By providing a path for cam groove 152 such as that shown in FIG. 11, the master indexing drive 140 is able to move the first and second rotary plates 12, 22 between their respective positions and thereafter release the driving force applied thereto so that the two plates 12, 22 can remain fixed in position by the detent 132 during the forming operations.

Figure 3:
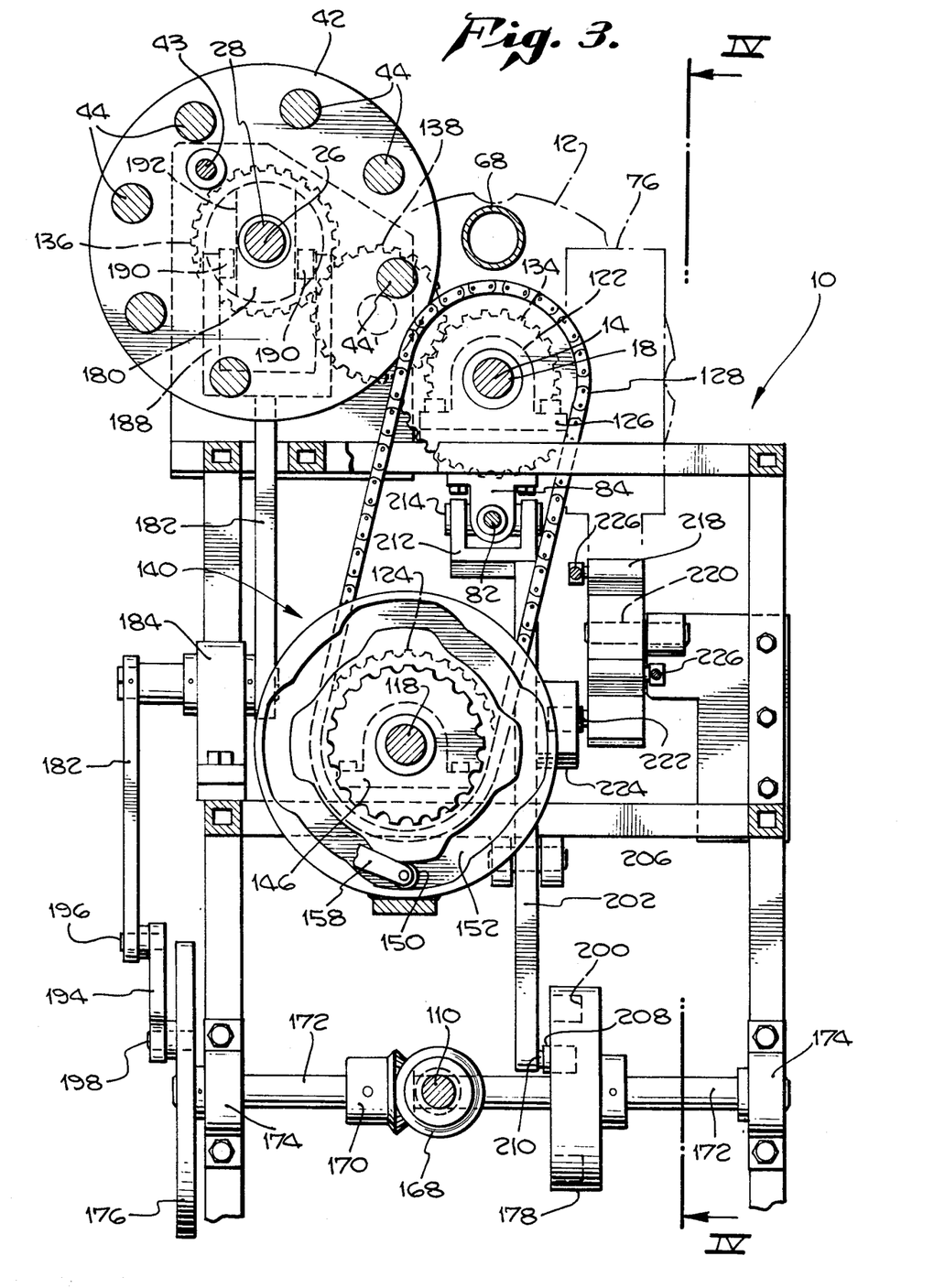
FIG. 3 is an elevation of the apparatus of FIG. 1 as seen in the plane III—III.

Referring now to FIGS. 1, 3, and 4, shaft 110 can be seen to have a bevel gear 168 attached thereto. Bevel gear 168, in turn, drives a second bevel gear 170 carried at right angles to bevel gear 168 by shaft 172 which is supported for rotation by journals 174. Shaft 172 has a flywheel 176 and a cam wheel 178 attached thereto for rotation in combination therewith. Non-rotating plate 42 is carried by a collar 180 on shaft 28. A cranked arm 182 is supported for rotation at the center portion thereof by journal 184. That is, cranked arm 82 is free to rotate about journal 184 as indicated by the arrows 186. One end of cranked arm 182 carries yoke 188 having rollers 190 disposed on the ends thereof and riding in grooves 192 of collar 180. Thus, as cranked arm 182 is rotated counter-clockwise as FIG. 1 is viewed, rollers 190 of yoke 188 will drive collar 180 forward (i.e. to the left) thrusting mandrels 44 through forming cups 34 as rollers 190 rise vertically and, therefore, as cranked arm 182 is rotated clockwise as FIG. 1 is viewed, rollers 190 of yoke 188 will drive collar 180 backward removing mandresl 44 from forming cupts 34 as rollers 190 descent vertically in grooves 192. The opposite end of cranked arm 182 is connected to the periphery of fly wheel 176 by link arm 194 connected at pivot points 196 and 198 respectively. Thus, as fly wheel 176 rotates in combination with shaft 172, collar 180 and non-rotary plate 42 are thrust inward and outward once for every revolution of fly wheel 176.

Continuing with reference to FIGS. 1, 3, and 4, cam wheel 178 can be seen to contain a cam groove 200 which moves in a pattern starting close adjacent shaft 172 and moving radially outward rapidly in approximately 90 degrees. Thereafter, cam groove 200 is disposed at equidistant radius for approximately 180 degrees of rotation whereupon it rapidly returns to the starting point in approximately 90 degrees. A thrust cam 202 is mounted for rotational motion in the direction of arrows 204 about pivot 206. The lower end of thrust cam 202 is provided with a roller cam follower 208 mounted on pivot 210 and disposed within cam groove 200. The other end of thrust arm 202 is provided with a yoke 212 engaging roller drive 214 disposed on the end of shaft 82 opposite presser member 80. As can be seen, as cam wheel 178 rotates beginning from the position shown in FIG. 1, roller cam follower 208 will be rapidly thrust radially outward rapidly moving thrust arm 202 in a counter-clockwise direction. Correspondingly, yoke 212 will thrust roller drive 214 inward as indicated by arrow 216 in FIG. 4 thrusting presser member 80 inward to the position shown in FIG. 5. During the approximately 180 degrees of rotation of cam wheel 178 wherein roller cam follower 208 is within the equidistant portion of cam groove 200 as shown in FIG. 4, presser member 80 will remain thrust into the dough lump 74 as shown in FIG. 5. Thereafter, as previously described with relation to the shape of cam groove 200, thrust arm 202 is rapidly turned clockwise to once again withdraw presser member 80 to the retracted position of FIG. 1.

A bell crank 218 is rotatably mounted by pivot 220 close adjacent the upper portion of thrust arm 202. Engaging roller 222 is disposed within parallel guide bars 224 on the upper portion of thrust cam 202. As can be seen with reference to FIGS. 1 and 4, as thrust arm 202 is rotated clockwise and counter-clockwise about its pivot 206, bell crank 218 is correspondingly rotated counter-clockwise and clockwise about its pivot 220. The two movable arms 76 are hingedly interconnected on either end by a pair of link arms 226 including shock absorbing members 227 to the ends of bell crank 218. As bell crank 218 is rotated counterclockwise, therefore, movable arms 76 are rotated away from one another about their respective pivot points 228. Correspondingly, as bell crank 218 is rotated clockwise, movable arms 76 are rotated towards one another about pivot points 228. Since bell crank 218 and, correspondingly, movable arms 76 are driven by the cam wheel 178, movable arms 76 move in a similar pattern to presser member 80. That is, they rapidly come together placing pressure pads 78 against dough lumps 74 as shown in FIG. 6 where they remain for approximately 180 degrees of rotation of cam wheel 178 whereafter they are rapidly withdrawn to their retracted position of FIG. 1.

Thus, it can be seen that the aforesaid apparatus provides the desired and required action of the various members whereby the mandrels 44 are continuously and smoothly rotated into and out of concentric engagement with the forming cups 34 to provide the required piercing and rolling action of the dough lump 74 to form the toroid shapes 98. Simultaneously, the presser member 80 is rapidly inserted into the dough lump 74, held for a period of time to allow the dough lump 74 to stabilize and rest in its acquired configuration, and rapidly withdrawn to move the web 94 into the position shown in FIG. 7 whereby the piercing action forces the web 94 from the center thereof radially outward into the annular portion 96 to provide a smooth annular dough lump 74' adapted for even forming into the bagel 98'.

Thus it can be seen that the foregoing apparatus and method of operation thereof for forming a bagel, or the like, from a contiguous piece of dough requiring no joining of free ends has met its objective of providing a bagel subjected to the minimum working of the dough in the formation thereof.

Wherefore, having thus described my invention, I claim:

1. Apparatus for automatically forming bagels or the like with a minimum working of the dough comprising:
   (a) a first rotary plate member adapted for rotation about a first axis and having a plurality of first cylindrical openings disposed therethrough at equal distances about a common radius from said first axis;
   (b) a second rotary plate member adapted for rotation about a second axis parallel to said first axis and having a plurality of second cylindrical openings disposed therethrough at equal distances about a common radius from said second axis, said second rotary plate member being disposed close adjacent and behind said first rotary plate member such that one of said first cylindrical opening and one of said second cylindrical openings can be positioned concentrically;
   (c) first indexing means for rotating said first and second plate members between a position where one each of said first and second cylindrical openings are concentrically aligned to a position where the next each in sequence of said first and second cylindrical openings are concentrically aligned;
   (d) a plurality of cylindrical forming cups carried by said second rotary plate member concentric with said second cylindrical openings, said forming cups facing away from said first rotary plate member and tapering outward from a first internal diameter at the inlet adjacent the front face of said second rotary plate member to a larger internal diameter adjacent the outlet at the opposite end of said forming cups;
   (e) a non-rotary plate member disposed concentrically about said second axis and adapted for longitudinal movement along said second axis between a position close adjacent said second rotary plate member and a position removed from said rotary plate member;
   (f) a plurality of cylindrical mandrels carried by said non-rotary plate member facing said first rotary plate member and being disposed to be concentric with said second cylindrical openings and said forming cups with one each of said first and second cylindrical openings concentrically disposed by said first indexing means, the end of the one of said mandrels disposed concentrically with said concentric first and second cylindrical openings being conical;
   (g) means for injecting dough into one of said first cylindrical openings and for formin said injected dough into disc-shaped dough lumps as said first rotary plate member is indexed between positions by said first indexing means;
   (h) means for forming the center of said disc-shaped dough lumps into a web;
   (i) second indexing means operably connected to said first indexing means for operating said web forming means each time said first indexing means has moved said first and second rotary plates on position; and,
   (j) third indexing means operably connected to said first indexing means for moving said non-rotary plate member from said removed position to said adjacent position and back again each time said first indexing means has moved said first and second rotary plates one position whereby said mandrels are thrust into said forming cups and removed therefrom to pierce said web of the one of said dough lumps at said conical pointed mandrel position and transfer said latter dough lump from said first rotary plate member to said second rotary plate member and to roll said dough lumps partially down said forming cups at the position of the others of said mandrels thus forming the bagel shape before said dough lumps finally emerge from said outlet end of the one of said forming cups at the position of the final one of said mandrels, said first indexing means being adapted to not index said first and second rotary plate members when said third indexing means has said mandrels inserted into said first and second cylindrical openings.

2. Apparatus for automatically forming bagels of the like as in claim 1 wherein:
   said forming cups have spaced, internal, circumferential gripping ridges disposed along the length thereof.

3. Apparatus for automatically forming bagels or the like as in claim 1 or claim 2 wherein:
   said cylindrical mandrels have spaced, external, circumferential gripping ridges disposed along the length thereof except for said piercing mandrel.

4. Apparatus for automatically forming bagels or the like as in claim 1 wherein said means for forming said injected dough into disc-shaped dough lumps comprises:
   (a) means for shearing off a lump of said injected dough within said one of said first cylindrical openings; and
   (b) means for pressing said sheared lump of dough into radial equal distribution within said cylindrical opening.

5. Apparatus for automatically forming bagels or the like as in claim 4 wherein:
   said pressing means includes means for depressing the center of the dough lump in a preforming operation whereby less dough than normal can be employed to form an acceptably toroidal shaped bagel.

6. Apparatus for automatically forming bagels or the like as in claim 1 wherein said means for forming a web comprises:
(a) a planar support surface disposed close adjacent one side of said first rotary plate member at one of said first cylindrical openings;
(b) a presser member operably connected to said third indexing means, said presser member having a disc-shaped planar pressing surface and gripping ridges disposed adjacent therethrough, said presser member being moved between a forming position pressed concentrically into said one first cylindrical opening to press the dough therein against said support surface to form a web in the center of said dough and a retracted position where said first rotary plate member is free to be rotated between positions, said gripping ridges being adapted to rotate said dough back into one first cylindrical opening as said presser member is moved from said forming position to said retracted position to pull said web from said support surface and into the confines of the surrounding annular dough.

* * * * *